United States Patent [19]
Shibamoto

[11] 3,773,350
[45] Nov. 20, 1973

[54] SAFETY DEVICE
[76] Inventor: Iwao Shibamoto, No. 31-7, 2-chome, Nishi Sugamo, Toshima-ku, Tokyo, Japan
[22] Filed: May 25, 1971
[21] Appl. No.: 146,644

[30] Foreign Application Priority Data
May 26, 1970 Japan.............................. 45/44707
June 10, 1970 Japan.............................. 45/49527

[52] U.S. Cl............ 280/150 AB, 5/348 R, 182/137
[51] Int. Cl. ............................................ B60r 21/08
[58] Field of Search.............. 280/150 AB, 150 B; 244/138 R; 182/137

[56] References Cited
UNITED STATES PATENTS
3,624,810  11/1971  Hass .......................... 280/150 AB
2,974,912  3/1961  Namsick ........................ 244/138 R
3,250,065  5/1966  Frost............................ 244/138 R X
3,397,117  8/1968  Smith et al........................ 9/11 A
3,592,468  7/1971  Simendinger, Jr. .................. 9/11 A
3,125,770  3/1964  Reffell ............................. 9/11 A Primary Examiner—Kenneth H. Betts
Assistant Examiner—John P. Silverstrim
Attorney—Waters, Roditi, Schwartz & Nissen

[57] ABSTRACT

A safety device comprises a bag made of an air-impervious flexible material, means for abruptly expanding said bag from the foled state to its original shape, air passage openings for sucking the ambient air into said bag therethrough under the pressure differential between inside and outside of the bag in the bag expanding process and means for closing said air passage openings for sealably trapping the air in said bag.

8 Claims, 14 Drawing Figures

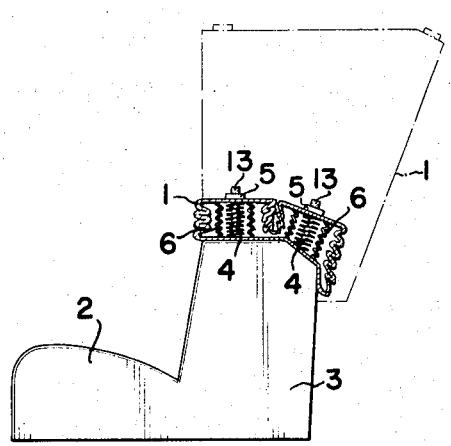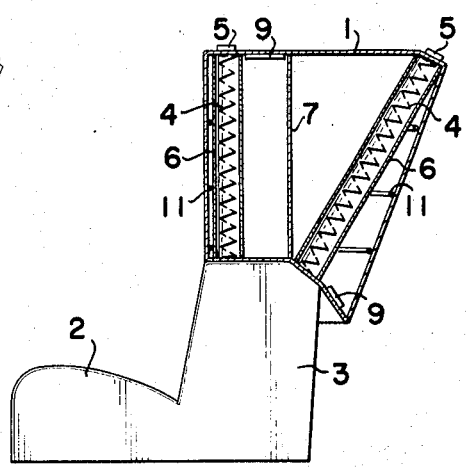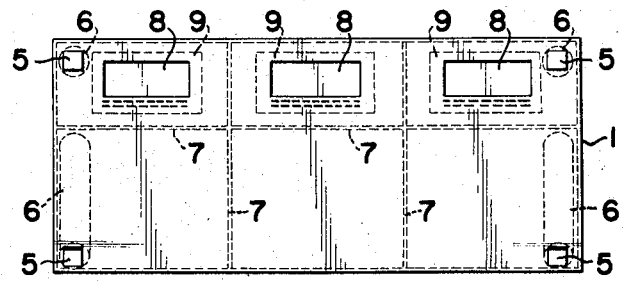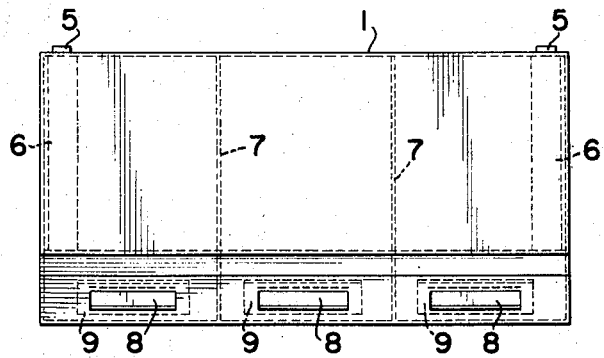

SAFETY DEVICE

This invention relates to a safety device and more specifically to a safety device for protecting the passengers of an automobile at the time of collision.

Many safety devices have been proposed heretofore for keeping the lives of the passengers safe against the shock given to the passengers at the time of automobile collision. These prior art devices almost unexceptionally include a fluid supply source (a liquefied gas or air supply source) which is so operative as to inflate an inflatable bag mounted in an automobile. In such devices, a gassified gas from the liquefied gas supply source or compressed air from the air supply source is introduced into a deflatable folded bag to inflate the same at the time of collision, so that the air pressure within the automobile rises abruptly, frequently causing a demage to the eardrum of the passenger. Furthermore, since the air pressure in the bag after said bag is inflated, is higher than the air pressure in the automobile, the body of the passenger, when abuts against the inflated bag, undergoes a strong reaction and occasionally is injured thereby.

The present invention has for its object the elimination or alleviation of the above-described defects.

The primary object of the invention is to provide a shock-absorbing safety device so designed that a bag is abruptly expanded from a folded state to its original state, whereby ambient air is sucked into and sealably trapped in the bag.

A further object of the invention is to provide a shock-absorbing safety device of the character described above, which is provided with an air passage opening for allowing the atmospheric air to flow into the bag therethrough when the bag is expanded from the folded state to its original state, and means for closing said air passage opening for sealably trapping the atmospheric air within the bag.

Another object of the invention is to provide a shock-absorbing safety device of the character described above, wherein means for expanding the bag abruptly from the folded state to its original state is elastic means disposed in the bag which is held in a pressure accumulating state while the bag is foled, but stretched as the bag is expanded.

Still another object of the invention is to provide a shock-absorbing safety device of the character described above, wherein the bag is arranged so as to be expansible from the folded state to its original state and provided with an expanding element for enabling the bag to expand when a pressurized gas is introduced thereinto.

These and other objects and advantages of the invention will become apparent from the following description with reference to the accompanying drawing illustrating the embodiments thereof.

FIG. 1 is a partially sectional view of the front seat of an automobile which is provided with a first embodiment of the safety device according to the present invention;

FIG. 2 is a view similar to FIG. 1 but illustrating the operation of the safety device;

FIG. 3 is a plan view of the bag of the safety device;

FIG. 4 is a front view of the bag;

FIG. 6 is a fragmentary sectional view showing the air passage opening and the check valve of the bag of the safety device, wherein

Figure 5:
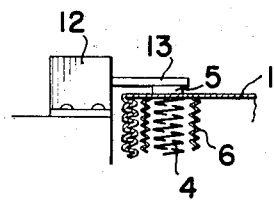
FIG. 5 is a fragmentary sectional view showing means for locking the safety device in an inoperative state.
Figures 6A, 6B:
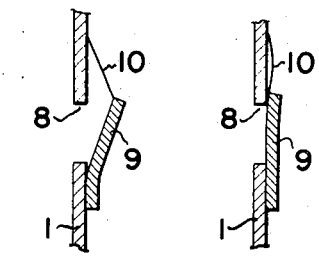
FIG. 6(a) shows the state when air is sucked into the bag and FIG. 6(b) shows the state when the air is sealed in the bag.

Referring to the drawing and particularly to FIGS. 1 to 6, the safety device of the invention includes a bag 1 made of a flexible, air-impervious material, said bag being mounted on the top of the back 3 of the front seat 2 of an automobile. A plurality of compressed coil springs 4, which are elastic means, are disposed in the bag 4 at the longitudinal ends thereof, with one ends thereof anchored to the back 3 and the other ends to a spring seat 5. Each compressed coil spring 4 is enclosed by a cylindrical cover 6 of flexible material so as to be kept out of contact with the bag 1. Partition walls 7 are arranged in the bag 1 so as to divide the interior of said bag into a plurality of compartments. A plurality of air passage openings 8 are formed in the top and bottom walls of the bag in communication with the respective compartments. A check valve 9 is provided in the bag adjacent each air passage opening 8 and secured to the bag at one side thereof, for opening and closing said air passage opening. This check valve 9, as clearly shown in FIG. 6, consists of a flexible plate member and, in order to facilitate the opening ane closing operation, is connected at its free edge with one end of an elastic string 10, the other end of which is connected with the bag. Reference numeral 11 designates loop-shaped ribs of elastic material which are secured to the inner wall of the bag in spaced relation along the height of the bag for the purpose of preventing the bag from slackening in the process of inflation or expansion.

As shown in FIG. 5, solenoid means 12 fixedly mounted at a suitable location within the automobile has a retractable operating member 13 and is actuated by a shock sensing device or shock predictting device known in the art. When the solenoid means 12 is not actuated, the operating member 13 is held in an outwardly projected position in engagement with the spring seat 5 on the top of the bag to hold the coil springs 4 in their compressed state. FIGS. 1 and 5 show the state in which the operating member 13 is in engagement with the spring seat 5, holding the bag in the folded state. It should be understood that other means, not shown, may be used for holding the bag in the folded state.

At the time of automobile collision, the solenoid means 12 is adapted to be actuated by actuation of the shock sensing device or shock predictting device and the operating member 13 is retracted and disengaged from the spring seat 5, whereupon the coil springs 4 extend to a predetermined length within the cylindrical covers 6 respectively, causing the bag to expand rapidly to the original shape as shown in FIG. 2. As the bag 1 expands, the air interior of the automobile is sucked into the bag through the air passage openings 8 due to the pressure differential between inside and outside of said bag, and the bag forms an air bag. Thus, when the passenger abuts against the air bag, the air pressure in the bag is increased and as a result, the check valves 9 are subjected to the increased air pressure and operated to close the respective air passage openings 8, thereby preventing the outward flow of air from said bag. The bag having the ambient air thus sealed therein completely receives the passenger by its soft cushioning action and holds the passenger against movement from the seated position.

Figure 7:
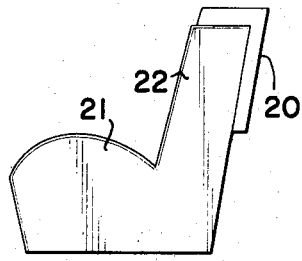
FIG. 7 is a side view of the front seat of an automobile which is provided with a second embodiment of the safety device of the invention.
Figure 8:
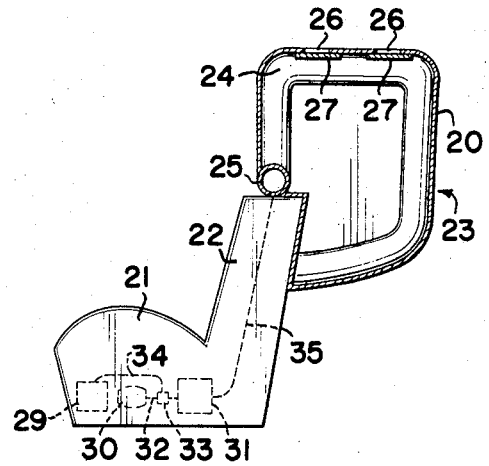
FIG. 8 is a partially sectional view illustrating the operation of the safety device of FIG. 7.
Figure 9:
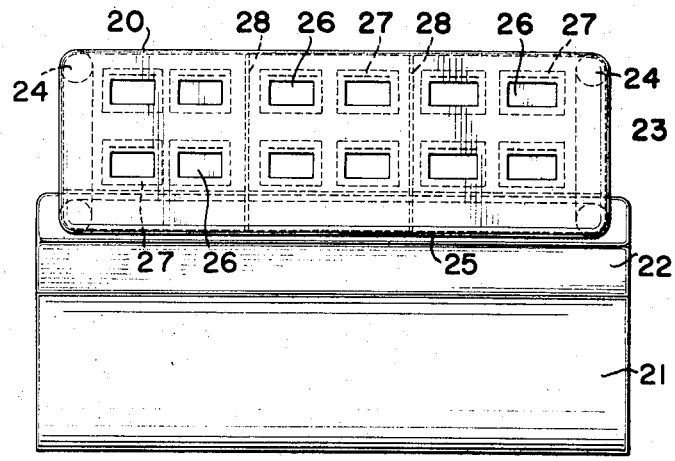
FIG. 9 is a plan view of the safety device of FIG. 7.

FIGS. 7 to 9 show the second embodiment of the safety device according to the present invention. This safety device includes a bag 20 made of a flexible, air-impervious material, which is mounted on the top of the back 22 of the front seat of an automobile. An expanding element generally indicated by numeral 23 is composed of inflatable flexible hollow members 24 extending substantially along the peripheral edges of the longitudinal opposite ends of the bag 20 and an inflatable flexible hollow members 25 extends between and communicates with said hollow members 24. The hollow member 25 mainly serves as a connecting means for conducting gas under pressure to the end hollow members 24. The hollow members 24, 25 may be formed as a portion of the bag or may be formed separately from the bag and secured to said bag. Air passage openings 26 are formed in the top wall of the bag 20 and check valves 27 are provided in the bag adjacent the respective air passage openings 26 and connected to the inner wall of said bag in the manner shown in FIG. 6. Partition walls 28 are disposed in the bag for separating the interior of the bag into a plurality of compartments. It will be understood that the hollow members 24, 25 are flattened when the bag is folded.

In FIG. 8, reference numeral 29 designates a shock sensing device or a shock predicting device or shock sensing device of the type known in the art which is connected through an electric wire 34 with a solenoid valve 33 provided in a pipe 32 which connects a liquid freon tank 30 with a freon vaporizer 31. The freon vaporizer 32 is connected with the hollow member 25 of the bag through a pipe 35. It will be understood that if the pipe 35 is connected with the end hollow members 24 through branch pipes, the hollow member 25 may be eliminated. In the operation, when the automobile collides against other automobile or an object, the solenoid valve 33 is actuated by actuation of the shock sensing device or shock predicting device and its valve element is opened, allowing liquid freon to flow from the freon tank 30 into the freon vaporizer 31 through the pipe 32, and the liquid freon is gassified in said freon vaporizer. The resulting freon gas flows through the pipe 35 into the then flattened hollow members 24, 25 in the folded bag to inflate the same. Thus, the bag 21 which has been folded as shown in FIG. 7, is abruptly expanded to its original shape. As the bag is expanded, air inside the automobile is sucked into the bag through the air passage openings 26 due to the pressure differential between inside and outside of the bag, and finally the air pressure in the bag becomes substantially equal to the air pressure in the automobile. When the passenger abuts against the thus inflated bag, the air inside the bag is compressed, so that the check valves 27 are actuated to close the respective air passage openings 26, thereby preventing the outward flow of air from the bag.

Although in this embodiment freon gas is used for inflating the hollow members which are folded together with the bag, it will be appreciated that compressed air may be used for the same purpose. In this case, the compressed air is contained in the tank 30 and the freon vaporizer can be eliminated.

Figures 10, 12:
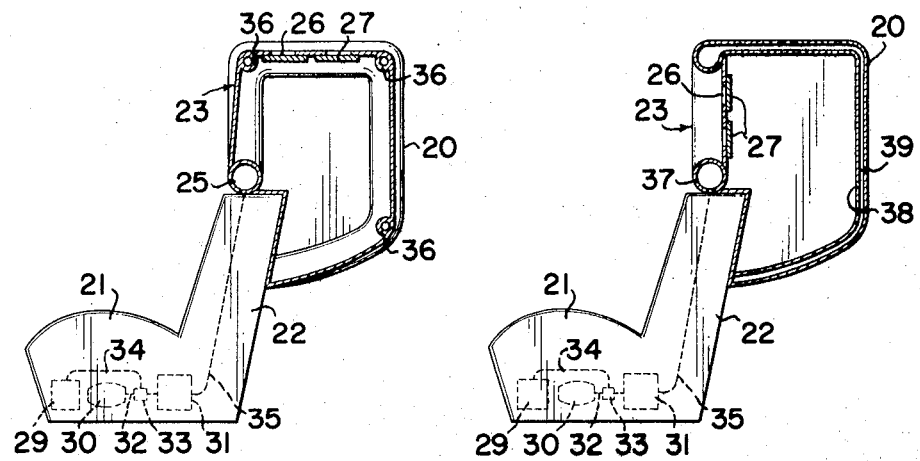
FIG. 10 is a partially sectional view illustrating the operation of a third embodiment of the safety device of the invention.
FIG. 12 is a partially sectional view illustrating the operation of a fourth embodiment of the safety device of the invention.
Figure 11:
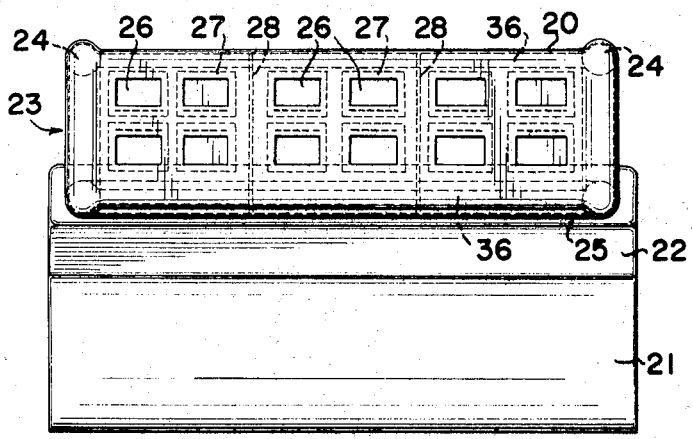
FIG. 11 is a plan view of the safety device of FIG. 10.

The embodiment shown in FIGS. 10 and 11 differs from that of FIGS. 7 to 9, only in that the expanding element 23 includes auxiliary flexible hollow members 36 extending longitudinally of the bag 20 at the corners of said bag and communicating with the inflatable flexible hollow members 24 formed at the opposed longitudinal ends of the bag, and the function of expanding the folded bag is substantially the same as that of the preceding embodiment. The auxiliary hollow members shown in FIGS. 10 and 11 further enhance the action of expanding the bag to its original shape and serve to prevent the distortion of inflated air bag when the passenger abuts against said bag.

Figure 13:
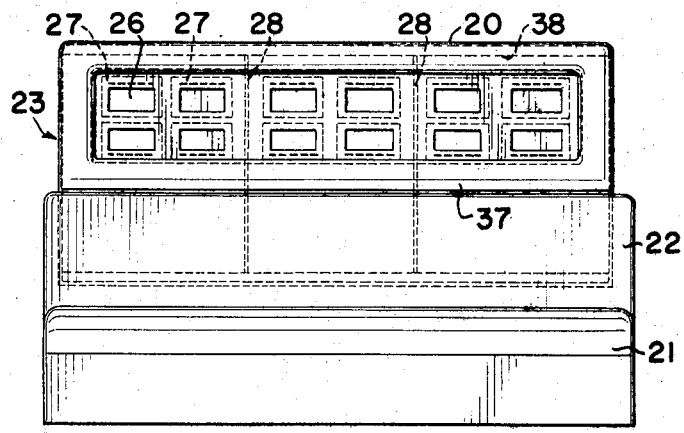
FIG. 13 is a front view of the safety device of FIG. 12.

In the embodiment shown in FIGS. 12 and 13, the bag has a flexible inflatable hollow member 37 formed along the periphery of the front wall thereof and an inner membrane 38 extending along the inner surface of the bag over the top, the rear and the bottom walls of said bag. This inner membrane 38 is secured to the inner wall 30 of the bag at the opposite end edges thereof and forms a hollow chamber 39 in cooperation with said inner wall, said hollow chamber 39 communicating with the hollow member 37 on the front wall of the bag. Thus, a pressurized gas is introduced into the flattened hollow member 37 on the folded bag and thence into the hollow chamber 39, while inflating said hollow member 37 and said hollow chamber 39, with the result that the bag is inflated. In this embodiment, the air passage openings 26 and the check valves 37 are provided in and on that portion of the front wall of the bag which is encircled by the hollow member 37 and where the inner membrane 30 is not provided, and the air in the automobile is sucked into the bag through said air passage openings 26 as the bag is inflated.

Although the present invention has been described herein in terms of specific embodiments thereof, it should be understood that the invention is not restricted only to those embodiments. It will be appreciated that the bag can be mounted, not only on the seat but also on the dash board, the handle or the ceiling.

What is claimed is:

1. A safety device for a vehicle having a passenger compartment, comprising a bag made of an air-impervious flexible material and having a portion secured to a stationary mounting within said vehicle; a flexible, inflatable framework operatively associated with said bag, said inflatable framework including a tubular member extending along the peripheral edge of the front wall of said bag, an air space formed between the inner surface of the bag and an inner membrane extending along the inner surface of said bag over the top wall, the rear wall and the bottom wall of the bag, and being secured to the end walls of the bag at its side edges, said air space and said tubular member communicating with each other; a source of pressurized gas operable upon the sensing of a vehicle collision, said framework being connected to said source for receiving said pressurized gas therefrom upon said source being operated, said framework, when inflated, being adapted to abruptly expand said bag from the folded state to its expanded shape to create a pressure differential between the interior and the exterior of said bag; and air passage openings for allowing introduction of ambient air into said expanded bag under said pressure differential.

2. A safety device according to claim 1, comprising check valves for closing said air passage openings to trap the introduced air in said bag.

3. A safety device according to claim 2, said air passage openings being provided in the wall of the bag, and said check valves being mounted on said wall adjacent the air passage openings.

4. A safety device according to claim 2, said air passage openings being provided in the top wall of the bag and said check valves being mounted on the inner surface of the top wall adjacent said passage openings.

5. A safety device according to claim 2, said air passage openings being provided in the front wall of the bag and said check valves are mounted on the inner surface of the front wall adjacent said passage openings.

6. A safety device according to claim 1, said inflatable framework forming a portion of said bag and being positioned on said bag so as to expand the bag to its expanded shape.

7. A safety device according to claim 1, said inflatable framework including end tubular members extending substantially along the peripheral edges of the opposed longitudinal ends of said bag, and a longitudinal tubular member extending between and communicating with said end tubular members.

8. A safety device according to claim 7, comprising auxiliary longitudinal tubular members between said end tubular members and in communication therewith.

* * * * *